C. E. MACBETH & F. C. STIENING.
RAIL SPLITTING SHEARS.
APPLICATION FILED MAY 8, 1909.
933,088.
Patented Sept. 7, 1909.
2 SHEETS—SHEET 1.
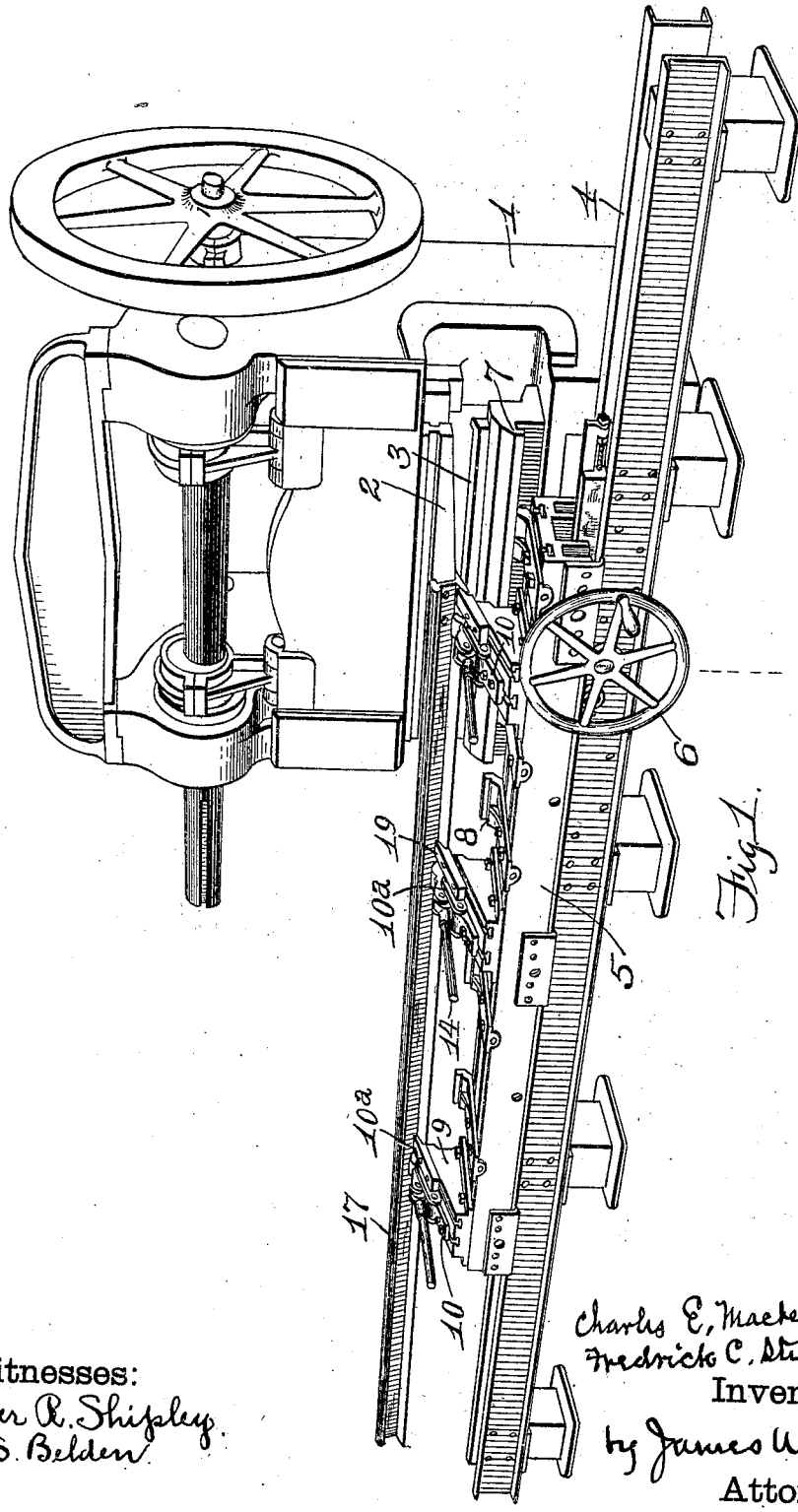
Witnesses:
Elmer R. Shipley
M. S. Belden
Charles E. Macbeth
Fredrick C. Stiening
Inventors
by James W. See
Attorney

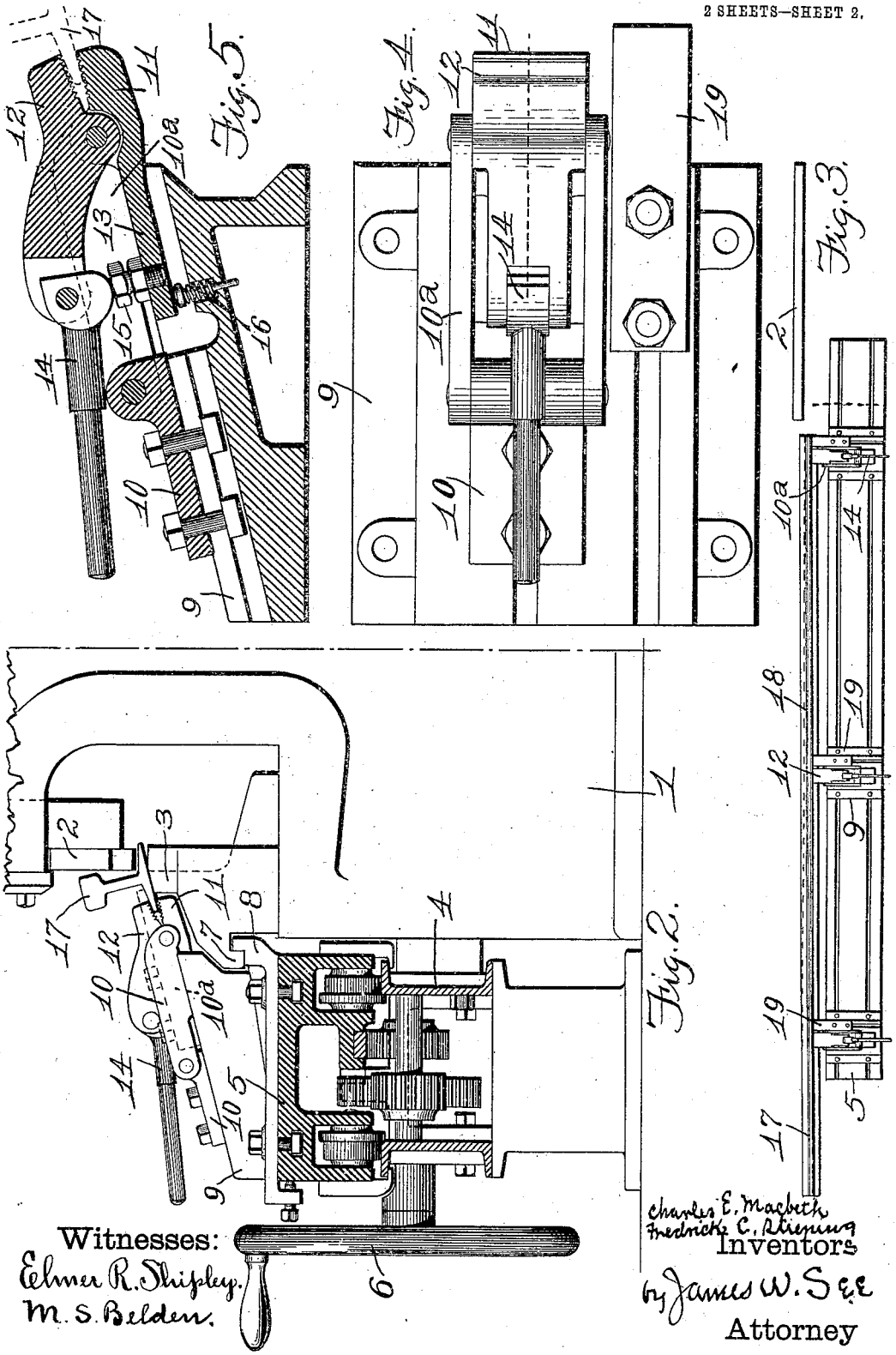

UNITED STATES PATENT OFFICE.

CHARLES E. MACBETH AND FREDRICK C. STIENING, OF HAMILTON, OHIO, ASSIGNORS TO THE LONG & ALLSTATTER COMPANY, OF HAMILTON, OHIO.

RAIL-SPLITTING SHEARS.

933,088. Specification of Letters Patent. Patented Sept. 7, 1909.

Application filed May 8, 1909. Serial No. 494,826.

*To all whom it may concern:*

Be it known that we, CHARLES E. MACBETH and FREDRICK C. STIENING, citizens of the United States, residing at Hamilton, Butler county, Ohio, have invented certain new and useful Improvements in Rail - Splitting Shears, of which the following is a specification.

In the making of switches and frogs from railway rails it often becomes necessary to slice off the side of a rail on a taper, the slicing including the head, the foot and part of the web. The work is usually done by planing or analogous operation, and the purpose of our present machine is to facilitate the shearing away of portions of the foot of the rail as a preliminary to further operations by planing &c.

Our invention will be readily understood from the following description taken in connection with the accompanying drawings in which:—

Figure 1 is a perspective view of a machine exemplifying our invention: Fig. 2 a side elevation of a portion of the shearing machine with the work carrying table appearing in vertical transverse section: Fig. 3 a plan of the table with a rail secured to it: Fig. 4 a plan of one of the rail clamps: and Fig. 5 a vertical section of one of the rail clamps in a plane at right angles to the length of the table. The drawings are on diverse scales.

In the drawings:—1, indicates a shearing machine of usual gate type: 2, its upper shear blade: 3, its lower shear blade, the upper shear blade having a rake both ways from its center of length, that is to say, the center of the blade is the lowest, whereby the work may be fed to the blades either from the right or from the left: 4, a long guideway disposed in front of the shearing machine and parallel with the blades: 5, a work-carrying table adapted for longitudinal movement along the guideway: 6, typical mechanism for moving the table along the guideway: 7, a rearwardly facing guide secured to the frame of the shearing machine parallel with the blades and with guideway 4: 8, jaws secured to the table and having forwardly projecting faces adapted to engage the guiding face of fixed guide 7: 9, a longitudinal series of clamp-blocks secured to the table and having upper faces declining forwardly from the shearing: 10, a pivot-block secured to the inclined upper surface of each clamp-block and adjustable to and from the shearing machine: $10^a$, links having their rear ends pivoted to the pivot-blocks: 11, lower clamp jaws pivoted to the forward ends of the links, the pivots being parallel with the shear-blades: 12, upper clamp jaws also pivoted to the forward ends of the links, the jaws presenting themselves toward the shear-blades: 13, a tail projecting outwardly from each lower jaw: 14, a lever cam pivoted in the rear portion of each upper clamp-jaw and adapted to engage downwardly on the tail portion of the lower clamp jaw whereby the jaws may be forcibly closed: 15, adjustable surfaces carried by the tails of the lower jaws to be engaged by the cams: 16, a spring acting upwardly on the tail portion of each lower jaw: 17, a piece of rail clamped in the jaws in such position as to bring a portion of its foot between the shear-blades: 18, in Fig. 3, a dotted line indicating the line of the shearing to be effected on the foot of the rail held by the jaws: and 19, fingers carried adjustably by the clamp-blocks near the clamping jaws and adapted to present themselves over the outer foot flange of the rail.

The transverse angle of the tops of the clamp-blocks 9 is such that the rail held by the jaws will be presented to the shear-blades at such angle that the side of the rail-head will clear the face of the upper shear-blade when the foot of the rail is being sheared close to the web of the rail, in other words, the angle presentation of the rail is such that the shearing line may extend back in under the side of the rail-head.

The clamp-blocks may be adjusted along the table, being bolted in tee-slots therein so as to suit the piece of rail being operated upon. A piece of rail being clamped in the jaws, more or less tightly, it may be adjusted oblique to the shear-blades by properly adjusting the pivot-blocks 10 on the inclined upper surfaces of the clamp-blocks. When this has been done the rail may be tightly clamped in such relationship to the shear-blades that the line of shearing will be at the proper longitudinal angle to the axis of the rail.

The rail rests upon the lower shear-blade, and the mounting of the jaws at the inner ends of the links $10^a$ permits the rail to rest with a fair bearing on the lower shear-blade, and at the same time the pivoting of both jaws of a clamp to the forward ends of their links permits the foot of the rail to adjust itself to a fair transverse bearing on the angular top of the lower shear-blade. When the jaws are opened, by the actuation of the lever cams 14, the upper jaw rises free of the foot of the rail, and the lower jaw, by the action of spring 16, is caused to descend a trifle so as to relieve the rail entirely from the jaws. The rail having been properly clamped in the jaws, the table is to be traversed along the guideway step by step at each stroke of the shear-blade. With the rail set as indicated in Fig. 3, the table will be fed from the left to the right, while if the shearing is to be done at an angle opposite to that indicated in Fig. 3 then the feeding movement of the table will be from right to left. As the upper shear-blade descends, in doing the shearing, there will naturally be more tendency for the top of the rail to tip inwardly. The flexible character of the jaw-knotting would not resist this tendency, but the rigid fingers 19 will furnish the necessary resistance.

The guideway 4 on which the table travels may of course be so substantial and have the table so snugly fitted as to insure the proper maintenance of the line of shearing, but in the exemplifying machine special provision is made for securing accuracy of guiding independent of the tightness of fitting of the table upon its guideway. The rearwardly facing guide 7 is made a rigid part of the shearing machine and is arranged accurately parallel with the shear-blades, and it is located as close to the shear-blades as conveniently practicable, both vertically and horizontally. The jaws 8, which engage behind guides 7, are secured to the top of the table and can be adjusted along the table and there are to be a sufficient number of them to have at least one of them at all times in engagement with guide 7, the preference being that a pair of them, straddling one of the clamp-blocks should be at all times engaging guide 7. It is to be understood that guide 7 is substantially the same length of the shear-blades and consequently short when compared with the length of the table.

By this general construction it is possible to quickly adjust and clamp a piece of rail and then guide it accurately past the shear-blades to produce the desired longitudinal angle of cutting.

It is to be understood that the particular device illustrated represents merely one exemplification of our invention, the best mode in which we at present contemplate embodying the principle of our invention.

We claim:—

1. A rail-splitting shear comprising, a shearing machine having a lower shear-blade and an upper shear-blade, a guideway disposed parallel with the shear-blades, a table adapted for longitudinal movement on said guideway, mechanism for moving the table along the guideway, clamp-blocks carried by the table, a series of clamping jaws carried by said clamp-blocks and presenting themselves toward the shear-blades, and mechanism for forcibly closing the jaws, combined substantially as set forth.

2. A rail-splitting shear comprising, a shearing machine having a lower shear-blade and an upper shear-blade, a guideway disposed parallel with the shear-blades, a table adapted for longitudinal movement on said guideway, mechanism for moving the table along the guideway, clamp-blocks carried by the table, a series of clamping jaws carried by said clamp-blocks and presenting themselves toward the shear-blades in such position that a rail held thereby will have the foot of the rail presented to the shear-blades at such transverse angle that shearing may take place below the side of the rail-head, and mechanism for forcibly closing the jaws, combined substantially as set forth.

3. A rail-splitting shear comprising, a shearing machine having a lower shear-blade and an upper shear-blade, a guideway disposed parallel with the shear-blades, a table adapted for longitudinal movement on said guideway, mechanism for moving the table along the guideway, clamp-blocks carried by the table and having upper surfaces inclining toward the shear-blades, a series of clamping jaws carried by said clamp-blocks and presenting themselves toward the shear-blades and adjustable on the inclined surfaces of the clamp-blocks, and mechanism for forcibly closing the jaws, combined substantially as set forth.

4. A rail-splitting shear comprising, a shearing machine having a lower shear-blade and an upper shear-blade, a guideway disposed parallel with the shear-blades, a table adapted for longitudinal movement on said guideway, mechanism for moving the table along the guideway, clamp-blocks carried by the table, a series of clamping jaws carried by said clamp-blocks and presenting themselves toward the shear-blades, said jaws being pivotally connected with the clamp-blocks by pivots whose axes are parallel with the shear-blades, and mechanism for forcibly closing the jaws, combined substantially as set forth.

5. A rail-splitting shear comprising, a shearing machine having a lower shear-blade and an upper shear-blade, a guideway disposed parallel with the shear-blades, a table adapted for longitudinal movement on said guideway, mechanism for moving the table along the guideway, clamp-blocks carried by the table, links pivoted to the clamp-blocks and extending toward the shear-blades, clamping jaws pivoted to the forward ends of said links and presenting themselves toward the shear-blades, and mechanism for forcibly closing the jaws, combined substantially as set forth.

6. A rail-splitting shear comprising, a shearing machine having a lower shear-blade and an upper shear-blade, a guideway disposed parallel with the shear-blades, a table adapted for longitudinal movement on said guideway, mechanism for moving the table along the guideway, clamp-blocks carried by the table, a series of clamping-jaws pivotally carried by said clamping-blocks and presenting themselves toward the shear-blades, fingers carried by the clamp-blocks and projecting toward the shear-blades and adapted to project over the foot of a rail held by the jaws, and mechanism for forcibly closing the jaws, combined substantially as set forth.

7. A rail-splitting shear comprising, a shearing machine having a lower shear-blade and an upper shear-blade, a guideway disposed parallel with the shear-blades, a table adapted for longitudinal movement on said guideway, mechanism for moving the table along the guideway, clamp-blocks carried by the table, a series of clamping jaws carried by said clamp-blocks and presenting themselves toward the shear-blades, mechanism for forcibly closing the jaws, a guide rigidly supported by the shearing machine near and parallel with the shear-blades, and a series of jaws adjustably secured to the table and adapted to successively engage said guide, combined substantially as set forth.

8. A rail-splitting shear comprising, a shearing machine having a lower shear-blade and an upper shear-blade, a guideway disposed parallel with the shear-blades, a table adapted for longitudinal movement on said guideway, mechanism for moving the table along the guideway, clamp-blocks carried by the table, a series of clamping jaws pivotally carried by said clamp-blocks and presenting themselves toward the shear-blades, springs tending to depress the lower clamping jaws, and mechanism for forcibly closing the jaws, combined substantially as set forth.

CHARLES E. MACBETH.
FREDRICK C. STIENING.

Witnesses:
ELMER R. SHIPLEY,
M. S. BELDEN.